United States Patent [19]

Sloane

[11] 4,242,021
[45] Dec. 30, 1980

[54] REMOVABLY MOUNTED TRUCK BINDING POST

[76] Inventor: Glenn L. Sloane, 8825 Colbath, Panorama City, Calif. 91402

[21] Appl. No.: 973,604

[22] Filed: Dec. 27, 1978

[51] Int. Cl.³ .............. B60P 7/08; B61D 45/00; B65D 61/00

[52] U.S. Cl. .................... 410/96; 105/380; 224/42.45 R; 296/43; 410/101; 410/106; 410/110; 410/153

[58] Field of Search .............. 105/466, 475, 478, 380; 224/42.42 R, 42.45 R; 280/179 A, 179 B, 179 R; 296/43; 410/96, 101, 106, 109, 110, 153

[56] References Cited

U.S. PATENT DOCUMENTS

| | | | |
|---|---|---|---|
| 1,540,891 | 6/1925 | Lay | 296/43 |
| 1,991,900 | 2/1935 | Larsen | 224/42.45 R |
| 2,678,150 | 5/1954 | Lund | 296/43 X |
| 3,580,441 | 5/1971 | Zercher | 224/42.45 R X |
| 3,595,452 | 6/1971 | Anderson | 296/43 X |
| 3,677,562 | 7/1972 | Bronstein | 296/43 X |
| 3,802,722 | 4/1974 | Sauber | 280/179 A X |
| 3,893,568 | 7/1975 | Lile | 224/42.45 R X |
| 4,057,182 | 11/1977 | Kolkhorst et al. | 224/42.45 R |

*Primary Examiner*—Howard Beltran
*Attorney, Agent, or Firm*—Donald D. Mon

[57] ABSTRACT

A truck mounted binding post comprised of a shank and a mast having a plurality of laterally extending pads through which a tie pin is secured to form at least one clevis or shackle. The binding post is formed with a parting line between the shank and the mask just beneath the pads permitting the shank to be molded in a variety of shapes and sizes independent of the mast. Threaded mounting holes are provided at a side and bottom of the shank for securing the binding post to a truck body.

8 Claims, 5 Drawing Figures

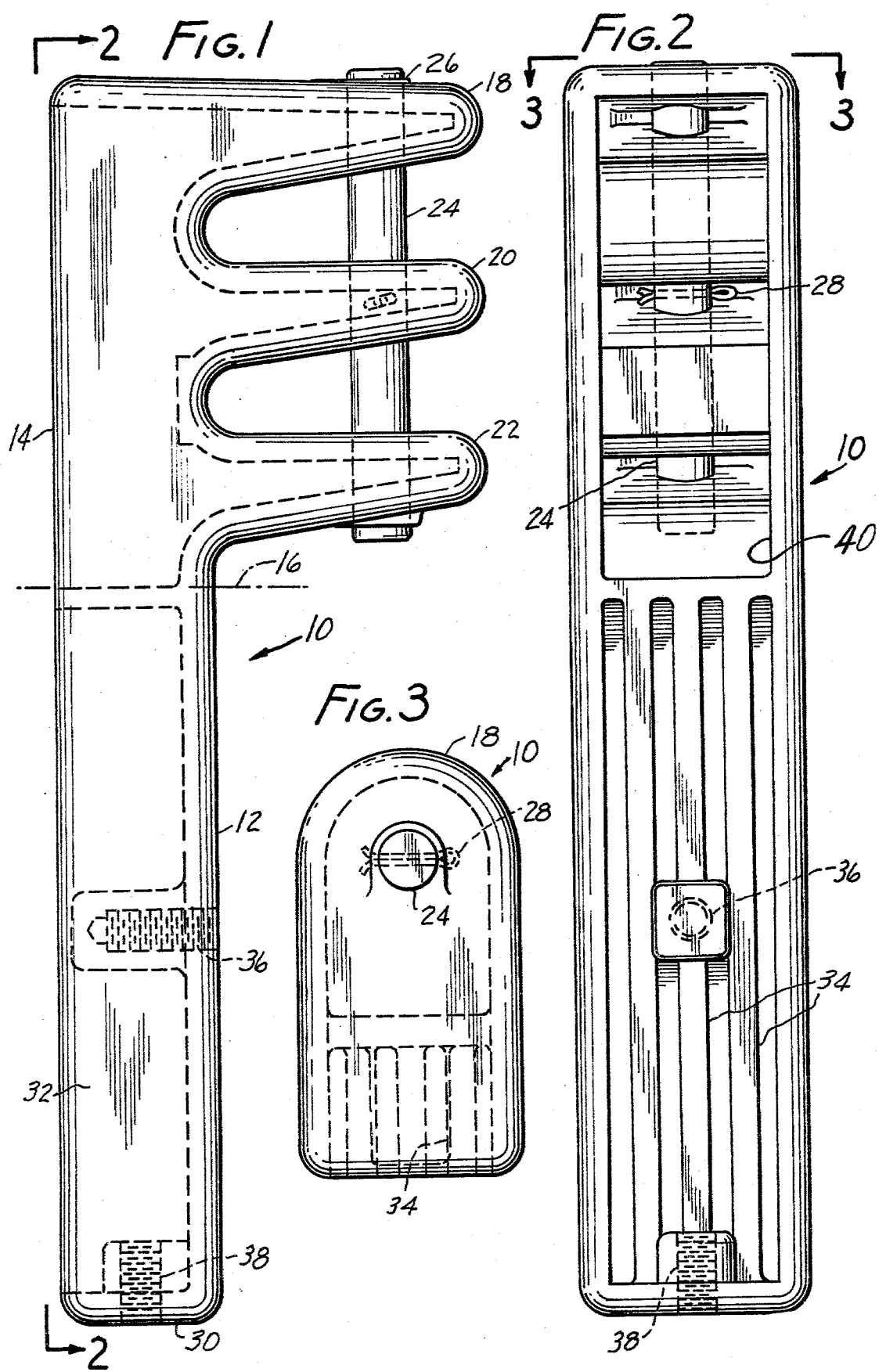

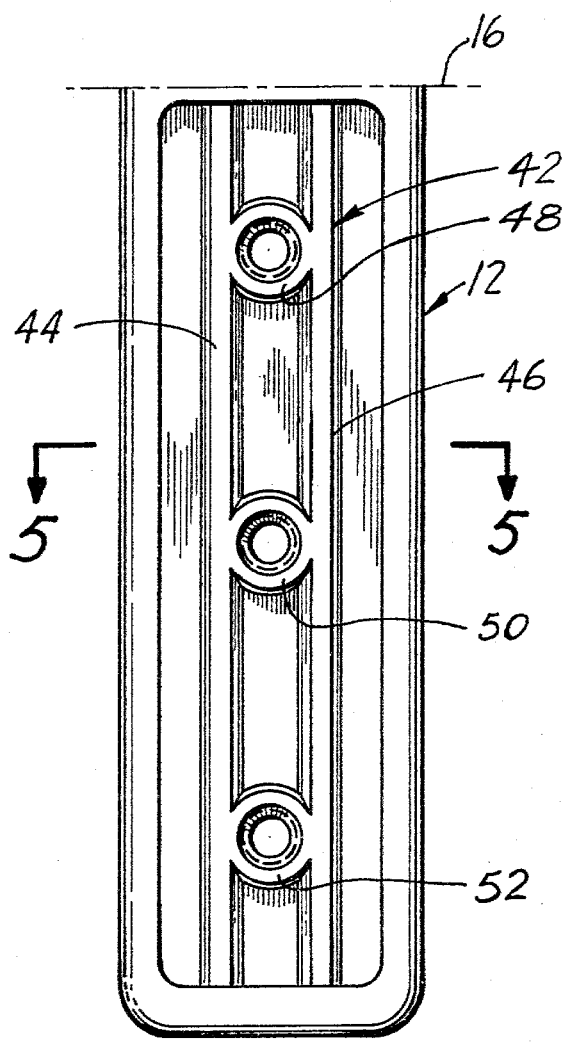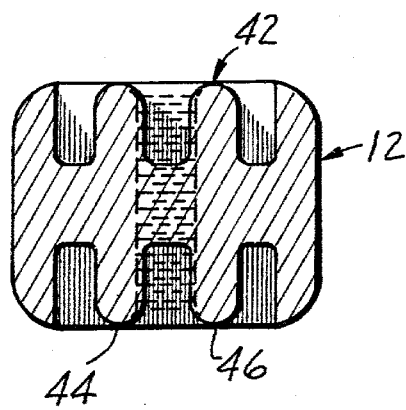

REMOVABLY MOUNTED TRUCK BINDING POST

BACKGROUND

The present invention relates to a tie bar or binding post for use as an accessory with various trucks, and particularly with pick-up trucks.

Especially on pick-up truck beds, recesses and holes are provided for receiving tie-down ropes. These are troublesome to use, and there is need for an accessory for them which will be readily accessible, and is easily installed and removed. Furthermore, in order to make it economically practical, it is useful to minimize costs of molds for making it.

SUMMARY OF THE INVENTION

The purpose of the present invention is to provide a pick-up truck binding post which can be readily constructed of a durable strong molded plastic, the production tooling which can inexpensively be altered to produce a variety of sizes, with the same mast, but different shanks.

The present invention is comprised of binding post having a shank and a mast with a plurality of pads or arms extending outward from the mast which can be formed into at least one clevis or shackle with a pin closing the end of the pads. The post is formed in a mold having a parting line near the terminus of the shank and mast just beneath the pads permitting the upper portion or clevis portion of the binding post to be standard while the shank can be varied by changing inserts in the mold to produce different shanks. In addition the shank is formed in a substantially hollow construction with or without stiffening ribs depending upon the function and use intended for the device. Threaded bosses or sockets are molded into the bottom end and in one or both sides of the shank for bolting the binding post to the truck bed or side walls when installed. In one embodiment the binding post may be installed with the shackles inboard or outboard.

It is one object of the present invention to provide a light weight inexpensive binding post for trucks.

Another object of the present invention is to provide a binding post which can be easily manufactured with a variety of sizes and shapes of shanks.

Other objects, advantages, and novel features of the invention will become apparent from the following detailed description of the invention when considered in conjunction with the accompanying drawings where like reference numbers identify like parts through out.

BRIEF DESCRIPTION OF THE DRAWINGS

FIG. 1 is a side elevation of a binding post according to the invention.

FIG. 2 is a rear view of the binding post taken at 2—2 of FIG. 1;

FIG. 3 is a top view of the binding post taken at 3—3 of FIG. 2.

FIG. 4 is a view of the shank portion of the binding post showing an alternate embodiment.

FIG. 5 is a sectional view of the shank portion taken at 5—5 of FIG. 4.

DESCRIPTION OF PREFERRED EMBODIMENT

Pick-up trucks are customarily provided with sockets to receive tie-down ropes. The binding post of this invention is placed in such sockets, where it will provided hold-down functions.

Referring to FIG. 1, a binding post 10 is shown with a shank 12 and a mast 14. A parting line or seam 16 formed in the molding process, appears between them, and signifies that the tooling parted here, and that it can therefore be made in sections, whose configuration can be changed by changing that part of the tooling, perhaps by exchanging inserts. A plurality of pads or arms 18, 20 and 22 extend outward from the mast portion of the binding post 10.

The pads or extensions 18–20 are closed to form at least one clevis by a tie pin 24 passed through a hole 26 formed in each of the respective pads. The tie pin 24 is secured in place by roll or cotter pin 28 passing through a hole drilled in the pin 24. The roll or cotter pin 28 is sufficient to retain the tie pin 24, as most force applied to the post is applied in a lateral direction.

The mast portion at the binding post is somewhat hollow from the rear side as shown in FIG. 2 at 40. For appearances the rectangular opening at the rear of the hollow mast is closed with a plate insert (not shown) after installation of the tie pin 24 and roll or cotter pin 28.

The binding post is of molded plastic construction produced in a separable mold which parts, and produces a part with a parting line at 16 permitting the shank portion 12 to be varied in shape, length and cross-sectional configuration if desired. This allows the binding post to have a standardized mast portion and clevis portion, with the shank being molded for various uses. The shank can be solid or hollow as indicated with or without stiffening ribs and has molded bosses or sockets 36 and 38 threaded to accept bolts for securing the binding post to the bed or side wall of a truck. A number of types of plastic are suitable for molding the binding post but a high strength, easily molded plastic is preferred.

The shank 12 is constructed in one of two forms shown in FIGS. 1, 2, 5 and 6 with the construction shown in the latter two figures preferred because of its strength and versatility. In each case stiffening ribs are used. In FIGS. 1 and 2 several stiffening ribs are visible from the rear of the mast with bosses or bolt sockets 36 and 38 molded in for attaching the binding post to the sides wall or bed of a truck. Thus the shank in FIGS. 1 and 2 appears partially hollow, closed or the front side with stiffening ribs 34 at the rear.

The preferred construction of shank 12 is the symmetrical form shown in FIGS. 4 and 5. Only the shank 12 is shown up to the parting line 16 to illustrate how the shank design can be changed to adapt the binding post to various designs for specific uses if desired. The design shown in FIGS. 4 and 5 has a twin I beam construction with a center I beam 42 formed on the shank 12 for maximum strength the central I beam 42 is formed of a pair of webs 44 and 46 centrally located in the shank 12 with three bosses or bolt sockets 48, 50 and 52 spaced along the length of the shank 12 between the webs 44 and 46 forming the I beam 42. The bosses 48, 50 and 52 are holes threaded completely through the shank 12. With the symmetrical twin I beam shape and threaded bosses the binding post can be installed with the clevis or mast portion inboard or outboard as desired.

The pads or arms 18–20 extend outward from the mast 14 and have molded holes for the tie pin 24 or can be drilled after the molding process if desired. The tie pin 24 is preferably a metal rod but may be of any strong rigid material if desired.

Obviously many modifications and variations are possible in light of the above teachings. Therefore the invention can be practiced otherwise than as specifically described with the scope of the limitation of the appended claims.

I claim:

1. A binding post for trucks comprising;
   a shaft having a shank and mast, said shank having an external regularly shaped surface that is insertable into a socket at one end and mounts the mast at the other end;
   a plurality of pads extending outward from the mast portion of said shaft;
   a tie pin passing through the ends of said pads to form at least one shackle; and
   said shaft being a molded integral structure with a parting line below said mast, which mounts said pads, whereby the molded shank can have various molded lengths and shapes, with the same mast.

2. A binding post according to claim 1 including threaded mounting holes at the bottom end and side of said shank whereby said binding post may be bolted to a truck bed.

3. A binding post according to claim 1 wherein there are three pads forming a pair of shackles.

4. A binding post according to claim 1 wherein said binding post is formed of a high strength plastic.

5. A binding post according to claim 1 wherein said shank is symmetrically constructed with an I beam shape centrally located between the I beam shape of the shank.

6. A binding post according to claim 5 including a plurality of bosses between the webs forming the I beam shape;
   said bosses being holes threaded through the shank whereby the binding post may mounted with the pads forming the shackle facing inboard and outboard.

7. A binding post according to claim 1 wherein said shank is open at the rear and is partially hollow with the front side being closed.

8. A binding post according to claim 7 wherein the partially hollow portion of said shank includes a plurality of vertical stiffening ribs.

* * * * *